United States Patent
Schwendemann et al.

(10) Patent No.: US 7,527,422 B2
(45) Date of Patent: May 5, 2009

(54) DRIVE UNIT FOR A TWIN-SCREW MACHINE

(75) Inventors: Daniel Schwendemann, Pfullendorf (DE); Ulrich Weller, Ingersheim (DE); Roland Kölbel, Waiblingen (DE)

(73) Assignee: Coperion GmbH, Stuttgart (DE)

( * ) Notice: Subject to any disclaimer, the term of this patent is extended or adjusted under 35 U.S.C. 154(b) by 238 days.

(21) Appl. No.: 11/693,479

(22) Filed: Mar. 29, 2007

(65) Prior Publication Data
US 2007/0234836 A1 Oct. 11, 2007

(51) Int. Cl.
B29B 7/80 (2006.01)

(52) U.S. Cl. .................................... 366/100; 74/665 L

(58) Field of Classification Search ............. 366/69–91, 366/297–301; 425/200–209; 74/414, 665 F–665 GD, 74/665 L–665 N
See application file for complete search history.

(56) References Cited

U.S. PATENT DOCUMENTS 6,632,009 B2 * 10/2003 Meyer ......................... 366/100
7,182,504 B2 * 2/2007 Wohlrab ....................... 366/83
2007/0234836 A1 * 10/2007 Schwendemann et al. ..... 74/414

FOREIGN PATENT DOCUMENTS

| DE | 10329035 | | 1/2005 |
|---|---|---|---|
| SU | 1634527 | * | 3/1991 |
| WO | 03/095178 | | 11/2003 |

OTHER PUBLICATIONS

"Ohne Getriebe" Plastverarbeiter, Huethig GMBH, Heidelberg, DE Bd. 53, Nr. 9, Sep. 2002, Seiten 84-85, XP001116280 ISSN: 0032-1338 *das ganze Dokument*.
Rexroth Bosch Group, Synchron-Torquemotoren Indradyn T Ubersicht Mar. 18, 2003 Uwe Weinmann, Branchenmanagement Werkzeugmaschinen.
Search Report for Parent EU 06006823.6, dated Aug. 31, 2006.

* cited by examiner

Primary Examiner—Charles E Cooley
(74) Attorney, Agent, or Firm—James B. Conte

(57) ABSTRACT

A drive unit for a twin-screw machine, of which the screw shafts, which can be driven in rotation in the same direction, have an axial spacing a, has two output shafts. The output shafts are provided with a respective crown gear which does not collide with the adjacent output shaft. The drive motor provided is in the form of a torque motor having a stator housing, a rotor, which is rotatably arranged in the stator housing, and at both ends of the rotor, outside the stator housing, a drive pinion meshing with a crown gear.

5 Claims, 3 Drawing Sheets

DRIVE UNIT FOR A TWIN-SCREW MACHINE

BACKGROUND OF THE INVENTION

1. Field of the Invention

The invention relates to a drive unit for a twin-screw machine which can be driven in rotation in the same direction and the screw shafts of which have axial spacing.

As the screws mesh with one another in screw machines of this type, the axial spacing is much smaller than the external diameter of the respective screws. The screw shafts, which are generally in the form of spline shafts, therefore have merely a comparatively small spacing from one another, so the drive is generally provided by a drive motor via a correspondingly complex branching gear preceded by or associated with a reduction gear.

2. Background Art

It is already known from WO 03/095178 A1 to use a torque motor as a direct drive for a multi-shaft extruder rotating in the same direction. This torque motor in the form of a hollow-shaft motor has, on the internal circumference of its hollow rotor, inner teeth on which crown gears attached to the output shafts roll. The output shafts are supported, inter alia, in radial bearings arranged in the hollow rotor. The axial forces have to be absorbed in a different manner. This known solution is complex and can be used merely for relatively small extruders.

It is also known from the journal "Kunststoffe" September 2004 to drive single-screw extruders using torque motors.

SUMMARY OF THE INVENTION

The object of the invention is to provide a drive unit of the general type which allows direct driving of the screw shafts and can be used in relatively large screw machines.

According to the invention, this object is achieved by a drive unit for a twin-screw machine with two screw shafts, which are rotationally drivable in the same direction, and which have an axial spacing a, with two output shafts, which have mutually parallel axes with an identical axial spacing a, which are configured for coaxial connection to the screw shafts and which in each case are provided with a crown gear which does not collide with the adjacent output shaft, and with a drive motor which is configured as a torque motor and has a stator housing, a rotor which has an axis of rotation and which is rotatably arranged in the stator housing and at both ends of the rotor, outside the stator housing, in each case a driven pinion which in each case is coupled with one of the crown gears.

Since each of the driven pinions is arranged, at both ends, outside the stator housing and each meshes with the crown gear attached to each output shaft, the overall size is not restricted. Moreover, transmission of this type is comparatively inexpensive. In particular, use can be made of two opposing drive motors which are arranged mirror-symmetrically to the second plane spanned by the axes of the output shafts and which also compensate for a large portion of the radial forces occurring during driving. This configuration can be used, in particular, for large extruders.

Further features, advantages and details of the invention will emerge from the following description of an embodiment given with reference to the drawings.

BRIEF DESCRIPTION OF THE PREFERRED EMBODIMENT

Figure 1:
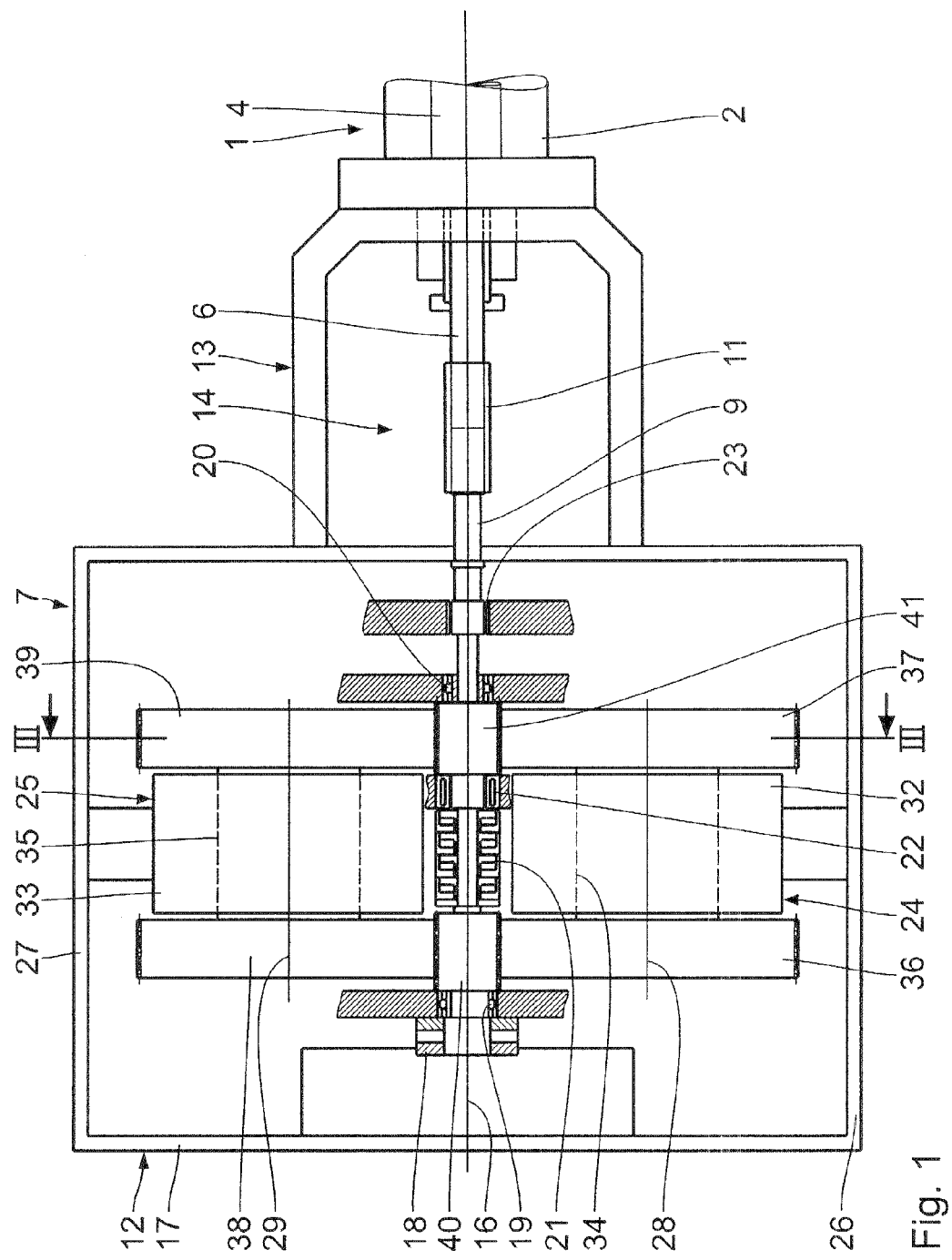
FIG. 1 shows a schematic side view of an extruder unit with a drive unit according to the invention.

The extruder 1 shown in the drawings has a housing 2 (merely indicated) in which are formed holes 3, 4, which interpenetrate in part. Arranged in the holes 3, 4 are screw shafts 5, 6 on which screw elements, kneading discs and the like (not shown) are arranged.

The screw shafts 5, 6 are driven by a drive unit 7, the output shafts 8, 9 of which are each rotationally engaged with the screw shafts 5, 6 using coupling sleeves 10, 11. The drive unit 7 has a housing 12 which is connected to the housing 2 of the extruder 1 using what is known as a lantern 13. The region within the lantern 13 comprising the coupling sleeves 10, 11 connecting the output shafts 8, 9 and the screw shafts 5, 6 forms a coupling 14 between drive unit 7 and extruder 1. The holes 3, 4, the screw shafts 5, 6 and the output shafts 8, 9 each have a common continuous axis 15 or 16. The construction of the extruder unit as described hereinbefore is in practice very generally conventional and widespread.

A respective output shaft 8 or 9 is arranged coaxially with the screw shaft 5, 6 driven thereby, over the entire length of the output shaft 8, 9 in the housing 12 of the drive unit 7. A output shaft 8 extends through the housing 12, where it is supported in the region of its rear wall 17 using an axial bearing 18. This output shaft 8 is also supported relative to the housing 12 using two radial bearings 19, 20 set apart from each other in the direction of the axis 15. The output shaft 9 is also supported relative to the housing 12 using an axial bearing 21 and two radial bearings 22, 23 set apart from each other. The axial bearings 18, 21 absorb the very high axial forces acting in the direction of the axes 15, 16 and originating from the extruder 1.

Figure 2:
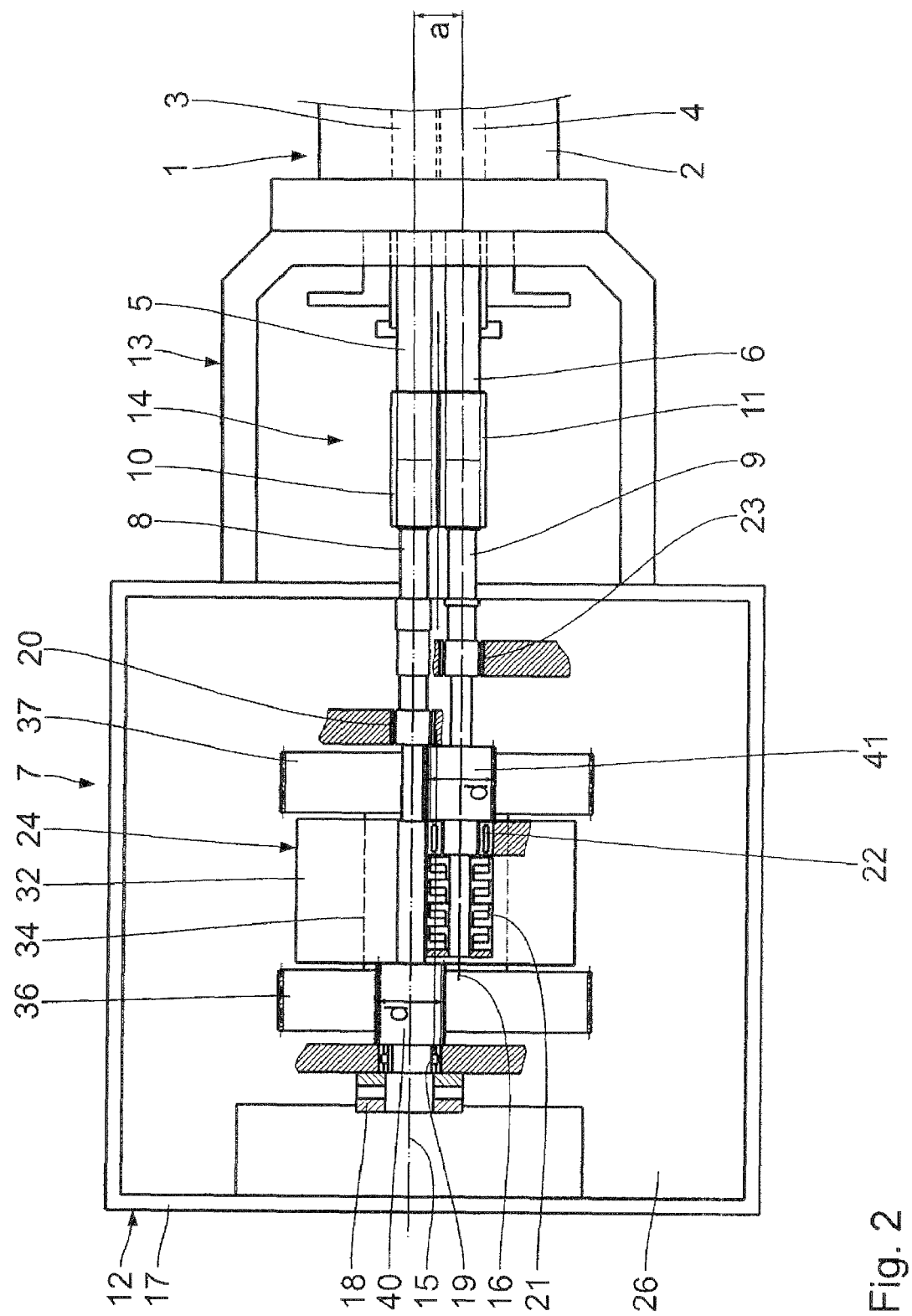
FIG. 2 shows a plan view onto the extruder unit shown in FIG. 2
Figure 3:
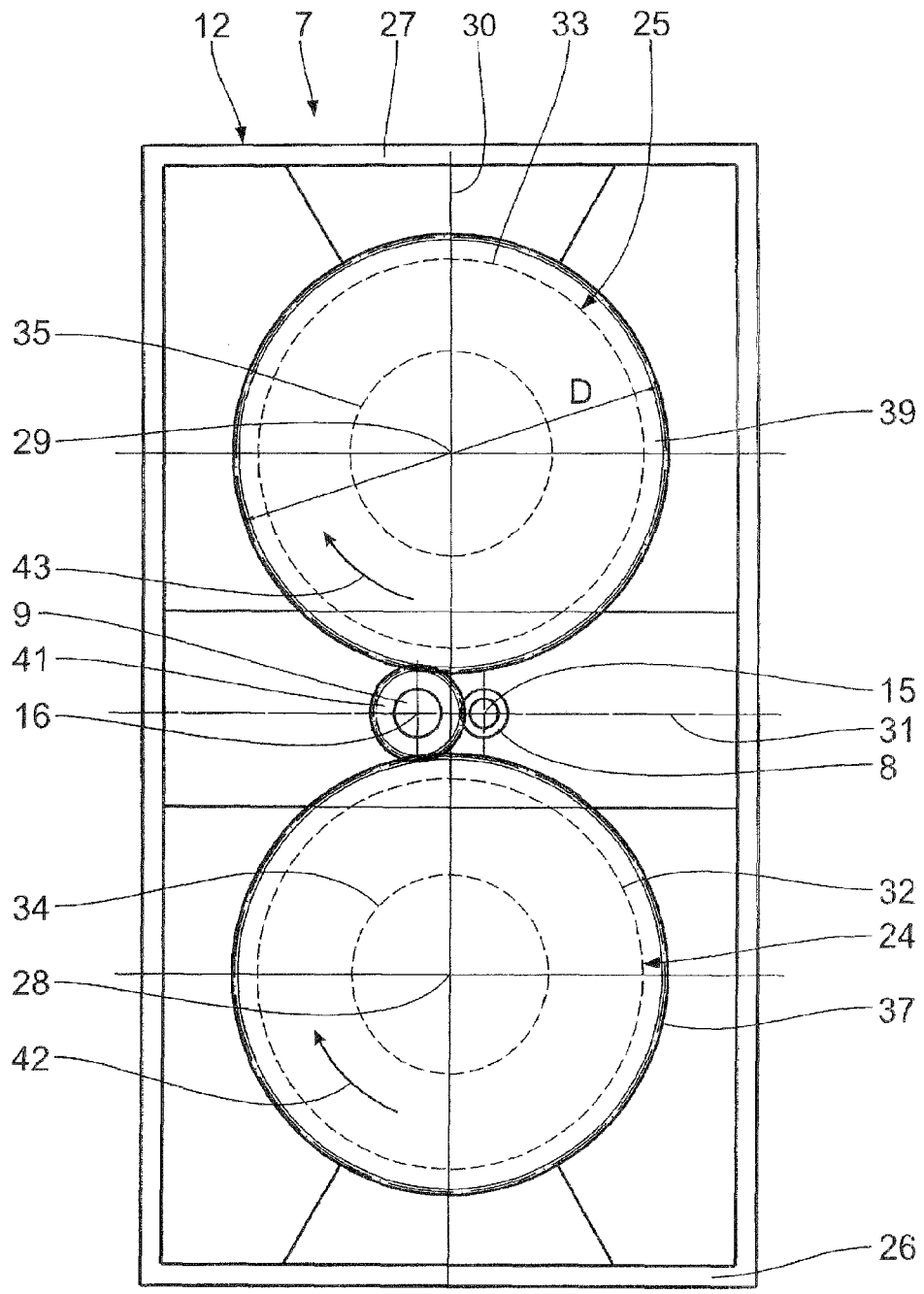
FIG. 3 shows a section through the drive unit corresponding to the section line III-III in FIG. 1.

In the illustrated embodiment, the two output shafts 8, 9 are driven using two drive motors 24, 25, of which merely the lower drive motor 24 is shown in FIG. 2. The two drive motors are arranged mirror-symmetrically to the horizontal plane 31 spanned by the two axes 15, 16 and supported relative to the base 26 or the covering wall 27 of the housing 12. The axes of rotation 28, 29 of the motors 24, 25 lie in a vertical plane 30 perpendicular to the plane 31 spanned by the axes 15, 16 and extend parallel to the axes 15, 16. As may be seen in particular from FIG. 3, the vertical plane 30 spanned by the axes of rotation 28, 29 intersects the horizontal plane 31 spanned by the axes 15, 16 exactly centrally between the axes 15, 16.

The drive motors 24, 25 are what are known as torque motors, i.e. motors which deliver a high torque even at very low speeds, so they can be used for direct driving. Torque motors of this type are known, for example, from WO 03/095178 A1 or the Rexroth Bosch Group publication "Synchron-Torquemotoren IndraDyn T", to which reference is made with regard to the internal construction of the drive motors 24, 25. The drive motors 24, 25 have outer stator housings 32, 33 in which rotors 34, 35 (merely indicated) are arranged. According to the invention, these rotors are provided, at both ends of the respective housing 32, with driven pinions 36, 37, 38, 39.

The two driven pinions 36, 38, which are adjacent to the rear axial bearing 18, mesh with a driven pinion 40 of the output shaft 8, adjacent to the axial bearing 18 and to the radial bearing 19. As may be seen from FIGS. 2 and 3, the axis 15 does not lie in the vertical plane 30 but rather is laterally offset from this plane 30 by half the axial spacing a between the axes 15, 16.

The two driven pinions 37, 39 facing the coupling 14 mesh accordingly with a crown gear 41 which is non-rotatably formed on the output shaft 9, the foregoing disclosure also applying to the axial arrangement. The crown gear 41 is located between the radial bearings 22, 23 and adjacent to the axial bearing 21 which is arranged between the drive motors 24, 25. The diameter d of the two crown gears 40, 41 is identical and specifically prevents the crown gear 41 from colliding with the output shaft 8 extending next to it. Even if the axes 15 and 16 are not arranged in the vertical plane 30, the arrangement of the two drive motors 24, 25 between the driven pinions 36, 38 and 37, 39 respectively and the associated crown gears 40 and 41 respectively substantially compensates for acting radial forces, as the diameter D of the four identical driven pinions 36 to 39 is large compared to the diameter d of the crown gears 40, 41. The following applies: $D \geq 3d$. The driven pinions 36, 38 and 37, 39 therefore oppose one another approximately diametrically.

In the case of small extruders, it may be sufficient to provide merely one drive motor. In this case, the upper drive motor 25 would generally be omitted, i.e. merely the lower drive motor 24 would be used. It will be clear from the foregoing that the output shafts 8, 9 are driven in the same direction corresponding to the arrows 42, 43 indicating the direction of rotation.

What is claimed is:

1. A drive unit for a twin-screw machine with two screw shafts (5, 6), which are rotationally drivable in the same direction, and which have an axial spacing a,
    with two output shafts (8, 9),
        which have mutually parallel axes (15, 16) with an axial spacing a,
        which are configured for coaxial connection to the screw shafts (5, 6) and
        which in each case are provided with a crown gear (40, 41) which does not collide with the adjacent output shaft (8, 9), and
    with a drive motor (24, 25) which is configured as a torque motor and has
        a stator housing (32, 33),
        a rotor (34, 35) which has an axis of rotation (28, 29) and which is rotatably arranged in the stator housing (32, 33) and
        at both ends of the rotor (34, 35), outside the stator housing (32, 33), in each case a driven pinion (36 to 39) which in each case is coupled with one of the crown gears (40, 41).

2. A drive unit according to claim 1, wherein the axis of rotation (28, 29) of the drive motor (24, 25) extends parallel to the axes (15, 16) of the output shafts (8, 9) and lies in a first plane (30) perpendicular to a second plane (31) spanned by the axes (15, 16) of the output shafts (8, 9), the first and second plane (30, 31) intersecting each other centrally between the axes (15, 16) of the output shafts (8, 9).

3. A drive unit according to claim 2, wherein two drive motors (24, 25) are provided which are arranged mirror-symmetrically to the second plane (31) spanned by the axes (15, 16) of the output shafts (8, 9).

4. A drive unit according to claim 1, wherein the driven pinions (36 to 39) have an identical diameter D and wherein the crown gears (40, 41) have an identical diameter d.

5. A drive unit according to claim 4, wherein $D \geq 3d$ applies to the ratio of the diameter D of the driven pinions (36 to 39) and the diameter d of the crown gears (40, 41).

* * * * *

UNITED STATES PATENT AND TRADEMARK OFFICE
CERTIFICATE OF CORRECTION

| | | |
|---|---|---|
| PATENT NO. | : 7,527,422 B2 | Page 1 of 1 |
| APPLICATION NO. | : 11/693479 | |
| DATED | : May 5, 2009 | |
| INVENTOR(S) | : Daniel Schwendemann et al. | |

It is certified that error appears in the above-identified patent and that said Letters Patent is hereby corrected as shown below:

Title page add: (30)　　Foreign Application Priority Data
　　　　　　　　　　Mar. 13, 2006　(EP)...06 006 823.6

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,527,422 B2  Page 1 of 1
APPLICATION NO. : 11/693479
DATED : May 5, 2009
INVENTOR(S) : Daniel Schwendemann et al.

It is certified that error appears in the above-identified patent and that said Letters Patent is hereby corrected as shown below:

This certificate supersedes the Certificate of Correction issued February 23, 2010. The Certificate should be vacated since petition under 37 CFR 1.55(c) was dismissed by office of petitions February 22, 2010, adding the Foreign Application Priority Data "March 13, 2006 (EP)...06 006 823.6", due to the incorrect filing date being listed. Therefore the Certificate of Correction should not have been issued. The applicant filed a second petition, filed March 17, 2010, which has been granted by the office of petitions and certificate of correction should read as follows:

Title Page add: (30) Foreign Application Priority Data

Mar. 31, 2006 (EP)....06 006 823.6

Signed and Sealed this

First Day of June, 2010

David J. Kappos
*Director of the United States Patent and Trademark Office*